(12) United States Patent
Toohey et al.

(10) Patent No.: US 12,549,588 B2
(45) Date of Patent: Feb. 10, 2026

(54) SYSTEMS AND METHODS FOR ESTIMATING VULNERABILITY RELATED TO NETWORK BLAST RADIUS OF A NETWORK ASSET

(71) Applicant: Wells Fargo Bank, N.A., San Francisco, CA (US)

(72) Inventors: Richard Toohey, Burlington, VT (US); Peter Bordow, Fountain Hills, AZ (US); Chao Chen, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 60 days.

(21) Appl. No.: 18/662,728

(22) Filed: May 13, 2024

(65) Prior Publication Data

US 2025/0350622 A1 Nov. 13, 2025

(51) Int. Cl.
*H04L 9/40* (2022.01)
(52) U.S. Cl.
CPC ................ *H04L 63/1433* (2013.01)
(58) Field of Classification Search
CPC .................................................. H04L 63/1433
USPC .......................................................... 726/25
See application file for complete search history.

(56) References Cited

U.S. PATENT DOCUMENTS

| | | | |
|---|---|---|---|
| 10,178,120 B1 * | 1/2019 | Keegan | H04L 63/1433 |
| 11,265,159 B1 | 3/2022 | Truskovsky | |
| 2015/0100671 A1 | 4/2015 | Song | |
| 2017/0032130 A1 * | 2/2017 | Joseph Durairaj | G06N 3/0499 |
| 2017/0180408 A1 | 6/2017 | Yu | |
| 2018/0048669 A1 * | 2/2018 | Lokamathe | G06N 5/04 |
| 2018/0278642 A1 * | 9/2018 | Joy | G06F 9/5044 |
| 2020/0267074 A1 * | 8/2020 | Wang | H04L 63/20 |
| 2020/0280577 A1 * | 9/2020 | Segal | H04L 63/20 |
| 2020/0326924 A1 | 10/2020 | A | |
| 2021/0149658 A1 | 5/2021 | Cannon | |
| 2021/0234889 A1 * | 7/2021 | Burle | H04L 63/20 |
| 2022/0084049 A1 * | 3/2022 | Soramäki | G06N 7/01 |

(Continued)

FOREIGN PATENT DOCUMENTS

| | | | | |
|---|---|---|---|---|
| CN | 117675413 A | * | 3/2024 | H04L 63/1441 |
| CN | 114662328 B | * | 4/2024 | G06F 30/20 |

OTHER PUBLICATIONS

Hohm et al., "Towards a maturity model for crypto-agility assessment," retrieved from https://arxiv.org/pdf/2202.07645; Feb. 17, 2022.

(Continued)

*Primary Examiner* — David P Zarka
(74) *Attorney, Agent, or Firm* — K&L Gates LLP

(57) ABSTRACT

An example method includes receiving a network graph and selecting a first network node from the set of network nodes. The example method further includes computing a difficulty score based on the difficulty for an attacker to compromise a second network node in an instance in which the attacker compromises the first network node and computing a cumulative difficulty score for the attacker to compromise the second network node based on a set of difficulty scores for the first network node and each other network node from the set of network nodes. The example method further includes adding the second network node to a set of blast radius nodes and determining a total vulnerability score for the first network node based on the set of blast radius nodes.

20 Claims, 5 Drawing Sheets

(56) References Cited

U.S. PATENT DOCUMENTS

| | | |
|---|---|---|
| 2022/0210200 A1 | 6/2022 | Crabtree |
| 2022/0224723 A1 | 7/2022 | Crabtree |
| 2022/0366332 A1 | 11/2022 | Duessel |
| 2023/0132703 A1* | 5/2023 | Marsenic ............ H04L 63/1433 726/25 |
| 2023/0289444 A1* | 9/2023 | Ermey ................. G06F 21/552 |
| 2024/0273227 A1 | 8/2024 | Thompson |
| 2025/0103720 A1 | 3/2025 | Bordow |

OTHER PUBLICATIONS

Ma et al., "CARAF: Crypto Agility Risk Assessment Framework," Journal of Cybersecurity; Apr. 30, 2021.

Valence, Arnaud, "ICAR, a categorical framework to connect vulnerability, threat and asset managements," retrieved from https://arxiv.org/pdf/2306.12240v1; Jun. 21, 2023.

\* cited by examiner

SYSTEMS AND METHODS FOR ESTIMATING VULNERABILITY RELATED TO NETWORK BLAST RADIUS OF A NETWORK ASSET

BACKGROUND

Determining vulnerability of network assets is critical for developing plans to protect and upgrade computing resources to prevent or mitigate the effects of attacks. Frequently, a compromised network asset can include a so-called blast radius of effect, wherein an attacker gaining access to the asset may be more easily able to gain access to a set of additional resources.

BRIEF SUMMARY

As cybersecurity threats proliferate, the challenges related to assessment of cybersecurity risks have become more pronounced. In particular, entities often form complex webs of relationships that may include links both internal and external to an organization, and these links may be lines of vulnerability leading from one resource to the next. For example, compromising a server from one organization that performs a critical security service for another organization may negatively impact both organizations in unforeseen ways.

Traditional risk assessment measures struggle to fully capture the complex and sometimes subtle relationships among computing entities. The volume of information is typically overwhelming and difficult to capture. Current methods for understanding risk related to security vulnerability are unable to perform reliable and comprehensive analysis of all pertinent data, including interconnectedness with assets of other organizations.

In contrast, example embodiments disclosed herein relate to a knowledge graph construct that incorporates information from existing organizational models and databases, including maps of physical network assets, organizational structures, risk models, and security policy directives. The knowledge graphs in example embodiments incorporate entities and relationships from risk modeling methods, including applications, nodes, geospatial information, cryptographic profiles, and remediation means. Example embodiments further incorporate maps of physical networked computing assets, and may incorporate security policy information and organizational structure to form a combined knowledge graph that completes a total picture of network assets and risk.

By collecting information into a knowledge graph, example embodiments may further utilize ontology-based inferences over the data. For example, insights may be gained relating to potential security threats, security vulnerabilities, or potential expansions to the structure of the network. The knowledge graph may add a layer of "blast radius" understanding to an analysis of security vulnerability. By gaining a complete understanding of the connectivity of organizational resources, the fallout of a hypothetical attack may be traced through the graph to create a more accurate estimation of the associated costs of the attack. The knowledge graph overlay may provide a more detailed risk assessment than models based on traditional databases, better assessing the risk to various categories such as customers, lines of business, and the like. The knowledge graph layer also provides an intuitive, user-friendly interface to users, which improves the understandability of logical connections between organization assets.

Accordingly, the present disclosure sets forth systems, methods, and apparatuses that estimate vulnerability related to network blast radius of a network asset. There are many advantages of these and other embodiments described herein. For instance, by aggregating information about network security and vulnerabilities into a knowledge graph, experts may easily browse an intuitive interface that connects related concepts contained in the network, leading to insights that are difficult to achieve in traditional presentations. In addition, developing a blast radius understanding of network vulnerabilities allows administrators to assess the risk of resources and connections that may exist outside of the purview of traditional network risk analysis, such as connections to vendors and other organizations.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
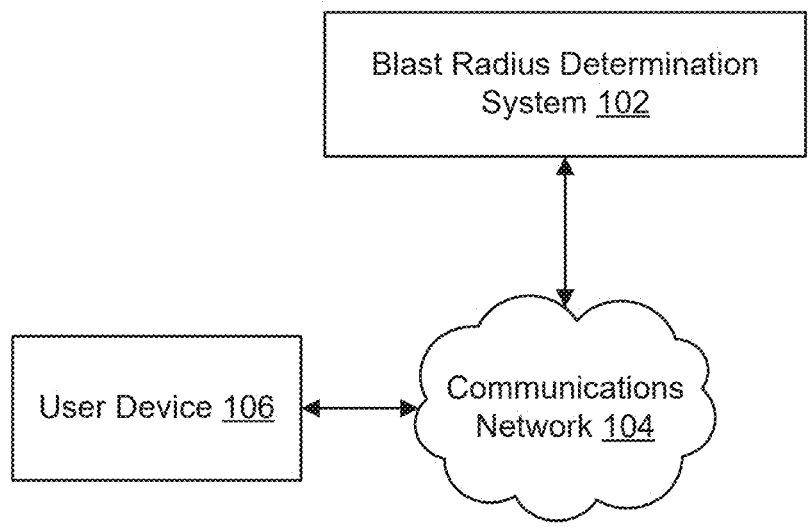
FIG. 1 illustrates a system in which some example embodiments may be used for estimating vulnerability related to network blast radius of a network asset.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "difficulty score" refers to a numerical value representing the difficulty to access or compromise a second network node under the assumption that a first network node is accessed or compromised, and may be expressed as a dimensionless quantity or using arbitrary units. In some embodiments, the difficulty score may be expressed as a number of expert hours, a probability, or other dimensioned quantities, or the difficulty score may be an abstract representation giving the relative difficulty to gain access to different computer network nodes. The definition of gaining access to and/or compromising a computing node may vary based on the nature of the node, the goal of the risk analysis being performed, and/or the like. For example, for a node representing a database of hashed passwords, the difficulty score to gain access to the node may include downloading the hashed passwords, but may not include gaining access to the plain text passwords (which may be extraordinarily difficult, or virtually impossible). The difficulty score may be a conditional difficulty score, which may be based on the assumption that the first network node and no other network nodes are compromised. The difficulty score may be cumulative difficulty score, which takes into consideration all possible pathways from the first network node to the second network node (e.g., compromising a third network node, and using the third network node to more easily gain access to the second network node).

System Architecture

Example embodiments described herein may be implemented using any of a variety of computing devices or servers. To this end, FIG. 1 illustrates an example environment 100 within which various embodiments may operate. As illustrated, a blast radius determination system 102 may receive and/or transmit information via communications network 104 (e.g., the Internet) with any number of other devices, such as user device 106.

The blast radius determination system 102 may be implemented as one or more computing devices or servers, which may be composed of a series of components. Particular components of the blast radius determination system 102 are described in greater detail below with reference to apparatus 200 in connection with FIG. 2.

The user device 106 may be embodied by any computing devices known in the art. The user device 106 need not be an independent devices, but may be embodied as one or more peripheral devices communicatively coupled to other computing devices.

Example Implementing Apparatuses

Figure 2:
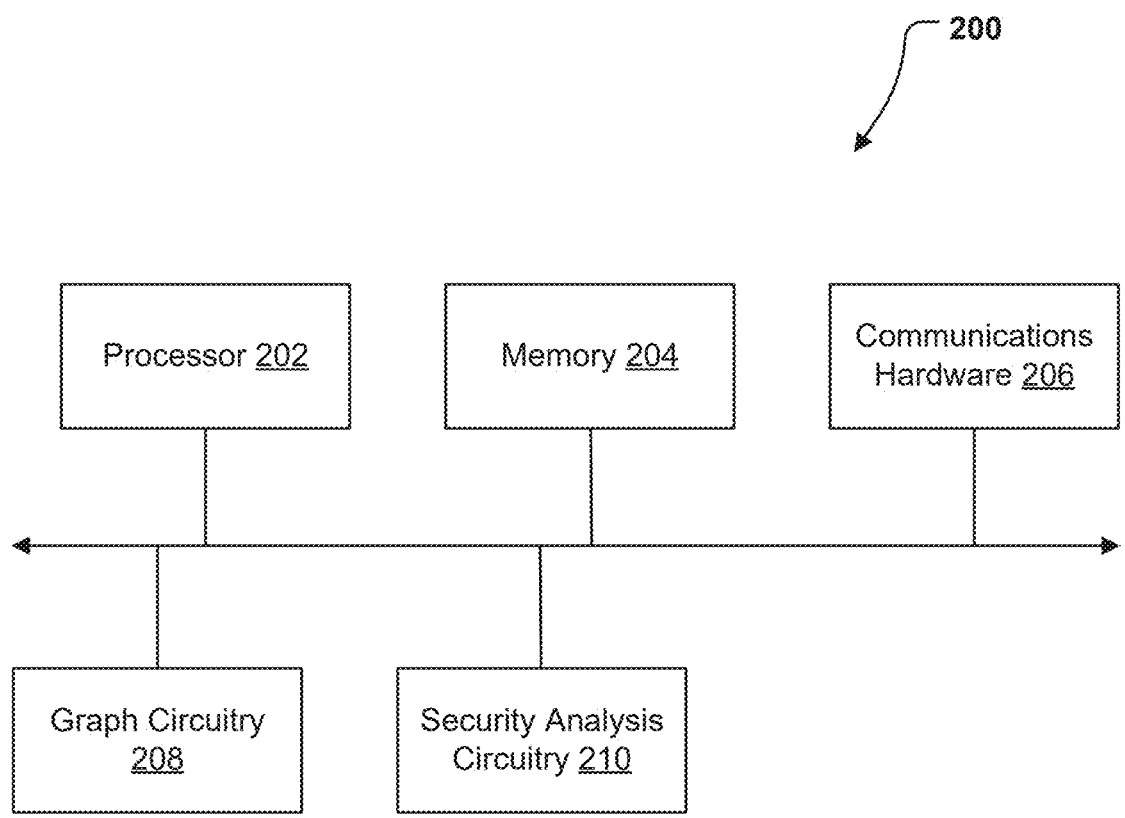
FIG. 2 illustrates a schematic block diagram of example circuitry embodying a blast radius determination system that may perform various operations in accordance with some example embodiments described herein.

The blast radius determination system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-4. As illustrated in FIG. 2, the apparatus 200 may include processor 202, memory 204, communications hardware 206, graph circuitry 208, and security analysis circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a graph circuitry 208 that selects network nodes and determines total scores from related graph nodes. The graph circuitry 208 may utilize processor 202, memory 204, or any other hardware component included in the apparatus 200 to perform these operations, as described in connection with FIGS. 3-4 below. The graph circuitry 208 may further utilize communications hardware 206 to gather data from a variety of sources (e.g., user device 106, shown in FIG. 1), and/or exchange data with a user, and in some embodiments may utilize processor 202 and/or memory 204 to manipulate and retrieve information from graphs.

In addition, the apparatus 200 further comprises a security analysis circuitry 210 that computes difficulty scores and cumulative difficulty scores for graph nodes. The security analysis circuitry 210 may utilize processor 202, memory 204, or any other hardware component included in the apparatus 200 to perform these operations, as described in connection with FIGS. 3-4 below. The security analysis circuitry 210 may further utilize communications hardware 206 to gather data from a variety of sources (e.g., user device 106, as shown in FIG. 1), and/or exchange data with a user, and in some embodiments may utilize processor 202 and/or memory 204 to determine vulnerability of graph nodes.

Although components 202-210 are described in part using functional language, it will be understood that the particular implementations necessarily include the use of particular hardware. It should also be understood that certain of these components 202-210 may include similar or common hardware. For example, the graph circuitry 208 and security analysis circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 200 to perform the various functions described herein.

Although the graph circuitry 208 and security analysis circuitry 210 may leverage processor 202, memory 204, or communications hardware 206 as described above, it will be understood that any of graph circuitry 208 and security analysis circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that graph circuitry 208 and security analysis circuitry 210 comprise particular machinery designed for performing the functions described herein in connection with such elements of apparatus 200.

In some embodiments, various components of the apparatuses 200 may be hosted remotely (e.g., by one or more cloud servers) and thus need not physically reside on the apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces and flowcharts.

Example Operations

Figure 3:
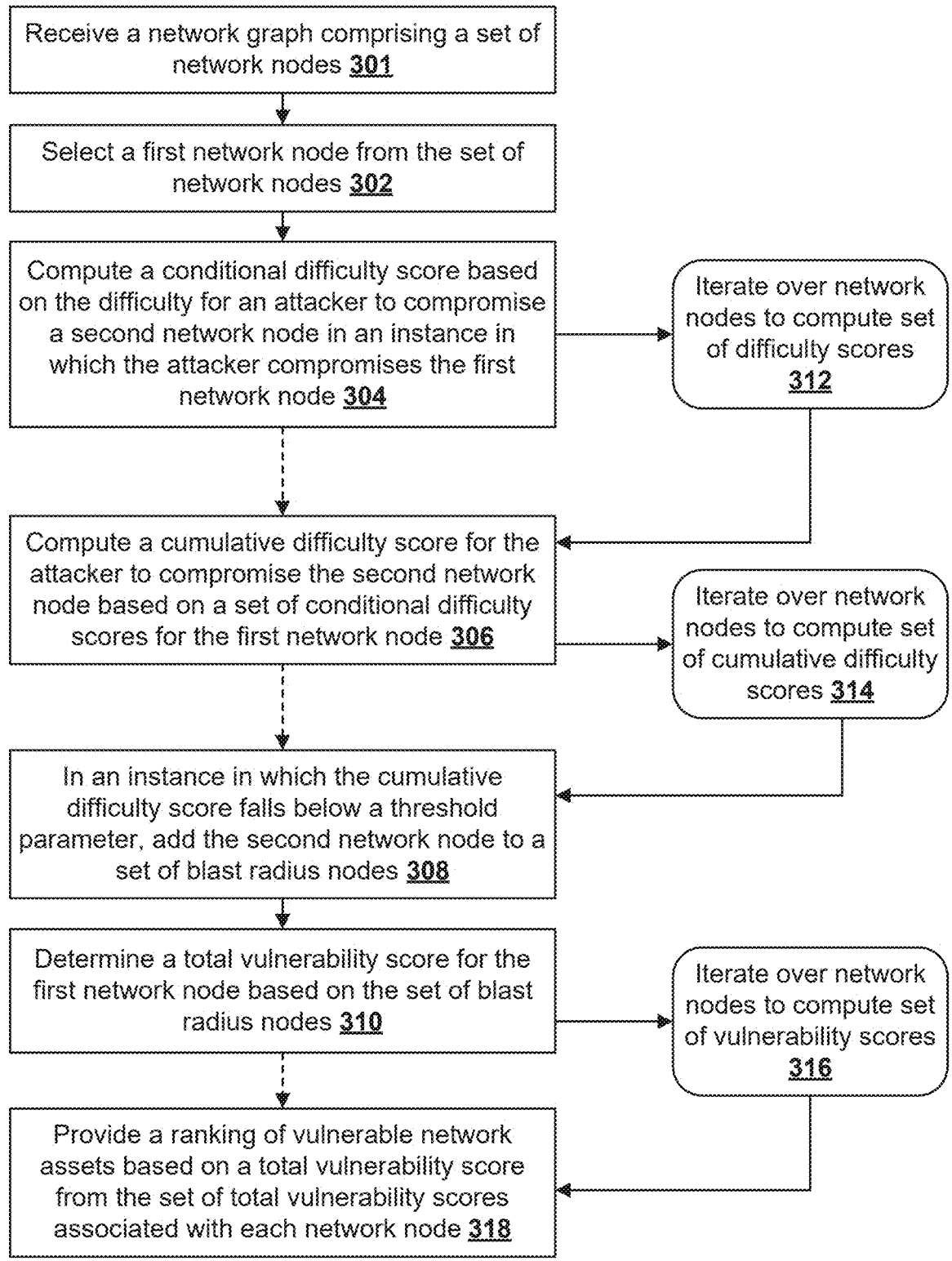
FIG. 3 illustrates an example flowchart for estimating vulnerability related to network blast radius of a network asset, in accordance with some example embodiments described herein.
Figure 4:
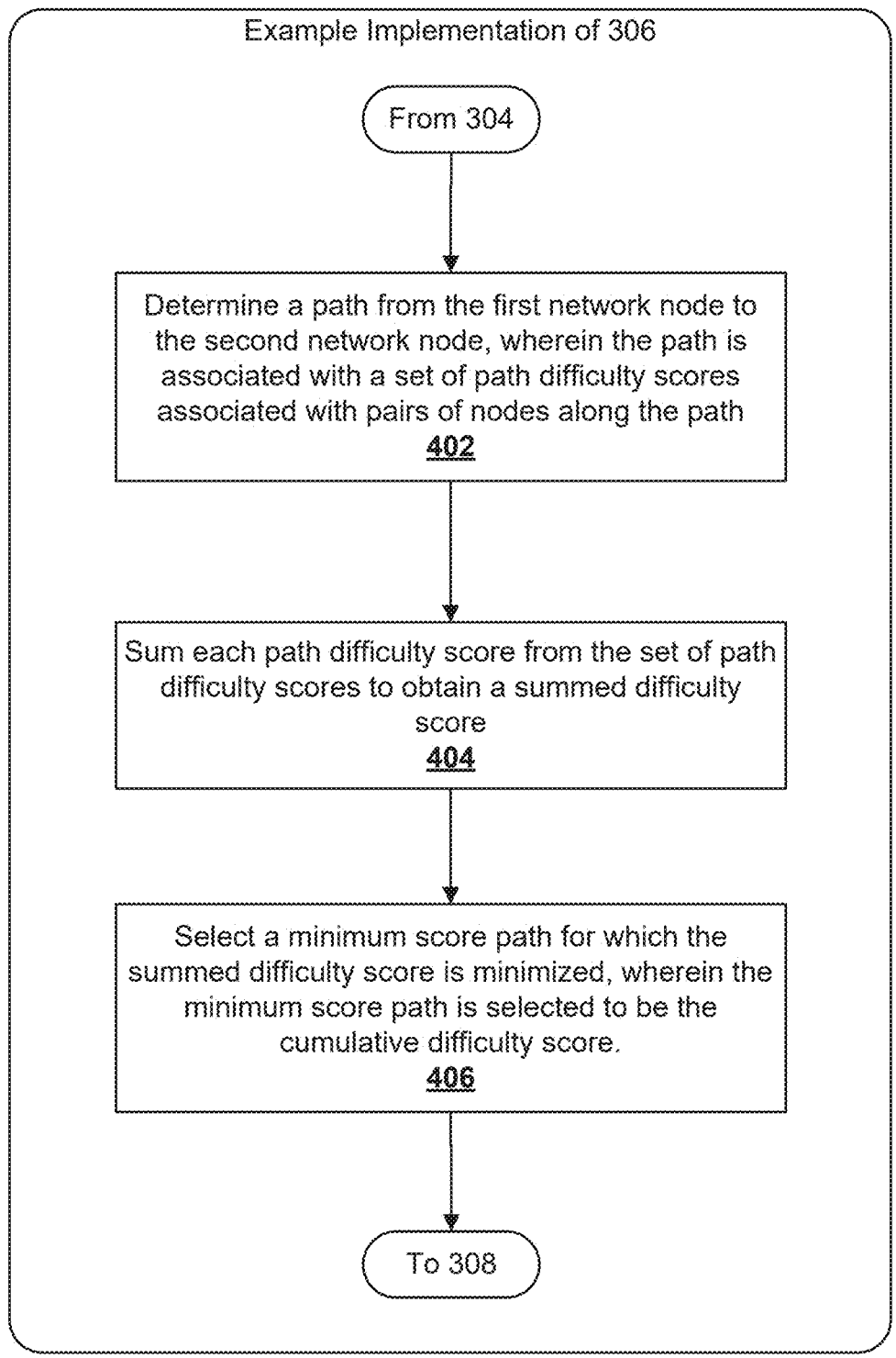
FIG. 4 illustrates an example flowchart for computing a difficulty score based on the difficulty for an attacker to compromise a second network node in an instance in which the attacker compromises the first network node, in accordance with some example embodiments described herein.

Turning to FIGS. 3 and 4, example flowcharts are illustrated that contain example operations implemented by example embodiments described herein. The operations illustrated in FIGS. 3 and 4 may, for example, be performed by the blast radius determination system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, graph circuitry 208, security analysis circuitry 210, and/or any combination thereof. It will be understood that user interaction with the blast radius determination system 102 may occur directly via communications hardware 206, or may instead be facilitated by a separate user device 106, as shown in FIG. 1, and which may have similar or equivalent physical componentry facilitating such user interaction.

Turning first to FIG. 3, example operations are shown for estimating vulnerability related to network blast radius of a network asset.

As shown by operation 301, the apparatus 200 includes means, such as memory 204, communications hardware 206, or the like, for receiving a network graph comprising a set of network nodes. The communications hardware 206 may receive the network graph via a network connection (e.g., via communications network 104), for example, via an application programming interface (API), file sharing protocol, web server, file transfer protocol, or any other methods known in the art. In some embodiments, the communications hardware 206 may retrieve the network graph from storage, such as memory 204, or remote storage such as a network attached storage device, file server, or other storage.

The network graph may be a knowledge graph comprising a set of network nodes. In various embodiments, the network nodes may be associated with other network nodes via subject-predicate-object relations. For example, node A and node B may represent physical devices that are directly connected by physical cabling, and may have a relationship "node A physically wired to node B". In another example, node A may be an application and node B may be a network host, which may have a relationship "node A installed on node B". The network graph may be a knowledge graph or other graph structure that includes expert information curated to represent a real-world network infrastructure.

The network graph may include multiple layers of abstraction related to a computing network. For example, nodes may represent physical hardware devices (e.g., routers, servers, switches, printers, mobile devices, Internet of Things (IoT) devices, and the like), applications, and/or data (e.g., databases, encrypted data, binary data, collections of documents, images, and/or the like).

In some embodiments, the network graph may include or may be associated with an ontology which may provide expert input that provides generalized properties to various classes of objects represented in the network graph. The ontology may define entities, relationships, classes of entities, properties, axioms, and/or the like that enable the application of semantic meaning to the various knowledge graph entities and relationship. The addition of an ontology to a network graph to form a knowledge graph may enable the use of reasoning and inference to define rules, draw conclusions, or extract data from the existing relationships of the knowledge graph.

As shown by operation 302, the apparatus 200 includes means, such as graph circuitry 208, or the like, for selecting a first network node from the set of network nodes. The graph circuitry 208 may select an initial network node based on any of a number of criteria. In some embodiments, the graph circuitry 208 may random select the first network node, or may begin with the network node having the lowest identification number. In various embodiments, a user may select a network node to begin computation, and the initial node may be specified by the user. The first network node may be selected to begin an iterative process that ultimately may include every network node, or at least may include a subset of the network nodes.

As shown by operation 304, the apparatus 200 includes means, such as communications hardware 206, security analysis circuitry 210, or the like, for computing a conditional difficulty score based on the difficulty for an attacker to compromise a second network node in an instance in which the attacker compromises the first network node and no other network nodes. The security analysis circuitry 210 may compute the difficulty score based on a combination of expert input and quantitative analysis. The security analysis circuitry 210 may, for example, use deep learning, machine learning, or other techniques to determine a difficulty score based on input features corresponding to expert input and objective characteristics of the network graph. The security analysis circuitry 210 may further use a trained model, for example, as described above, training on real-world examples, synthetic data, or the like to train a model based on known difficulty scores.

In various embodiments, the security analysis circuitry 210 may use a rules-based (e.g., may not use machine learning, deep learning, artificial intelligence, or the like) to determine a difficulty score based on expert input and objective data from the network graph. For example, security analysis circuitry 210 may ingest data regarding security vulnerabilities based on known hardware and software vulnerabilities, including comparative information for different vendors, version numbers, and the like. The security analysis circuitry 210 may use the ingested data to compute a difficulty score based on a formula or algorithm, which may be tuned using expert input, and may thus be developed without the use of large training datasets needed for machine learning and/or artificial intelligence approaches.

The difficulty score and/or conditional difficulty score may be a numerical value, and may be expressed as a dimensionless quantity or using arbitrary units. In some embodiments, the difficulty score may be expressed as a number of expert hours, a probability, or other dimensioned quantities, or the difficulty score may be an abstract representation giving the relative difficulty to gain access to different computer network nodes. The definition of gaining access to and/or compromising a computing node may vary based on the nature of the node, the goal of the risk analysis being performed, and/or the like. For example, for a node representing a database of hashed passwords, the difficulty score to gain access to the node may include downloading the hashed passwords, but may not include gaining access to the plain text passwords (which may be extraordinarily difficult, or virtually impossible). The difficulty score may be a conditional difficulty score, which may be based on the assumption that the first network node and no other network nodes are compromised.

In some embodiments, the determination of conditional difficulty scores described in connection with operation 304 may be performed initially without the assumption that any other network nodes have been compromised or that access to any other network nodes has been gained by an attacker, thus computing unconditional difficulty scores. Thus the unconditional difficulty score associated with many network nodes may be quite high to represent a virtually impossible task, such as decrypting encrypted data (node A) without a cryptographic key (node B). The graph circuitry 208 may then use the unconditional difficulty scores as one input to compute the conditional difficulty scores associated with each other node.

In embodiments in which an ontology is associated with the network graph and/or the network graph is a knowledge graph, computing the difficulty score may take into account various subject-predicate-object (or semantic triple) relationships. The subject-predicate-object relationships may include the input information that security analysis circuitry 210 may utilize to compute a difficulty score.

It will be understood that, although the computation of a single conditional difficulty score is described here, the method may iterate over each other network node in the network graph to determine a set of conditional difficulty scores, as indicated below and described in connection with operation 312.

As shown by operation 306, the apparatus 200 includes means, such as graph circuitry 208, security analysis circuitry 210, or the like, for computing a cumulative difficulty score for the attacker to compromise the second network node based on a set of conditional difficulty scores for the first network node and each other network node from the set of network nodes. An example implementation of operation 306 is described in connection with FIG. 4.

Turning next to FIG. 4, example operations are shown for computing a cumulative difficulty score.

As shown by operation 402, the apparatus 200 includes means, such as graph circuitry 208, or the like, for determining a path from the first network node to the second network node, wherein the path is associated with a set of path conditional difficulty scores associated with pairs of nodes along the path. The graph circuitry 208 may use the set of conditional difficulty scores for the first network node and each other network node from the set of network nodes. For example, in determining a path from first network node "A" to second network node "B", the graph circuitry 208 may determine a path such as "A, C, D, B". The graph circuitry 208 may then consider the conditional difficulty score associated with "A to C", "C to D", and "D to B" along the example path. In the example, the graph circuitry 208 may have access to each of the conditional difficulty scores, "A to C", "C to D", and "D to B", which may have been computed in connection with operation 304.

As shown by operation 404, the apparatus 200 includes means, such as graph circuitry 208, or the like, for summing each path conditional difficulty score from the set of path conditional difficulty scores to obtain a summed difficulty score. To continue the example above, the graph circuitry may sum the conditional difficulty scores for "A to C", "C to D", and "D to B" along the example path, and the summed difficulty score may be the path conditional difficulty score associated with the example path.

As shown by operation 406, the apparatus 200 includes means, such as graph circuitry 208, or the like, for selecting a minimum score path for which the summed difficulty score is minimized, wherein the minimum score path is selected to be the cumulative difficulty score. The graph circuitry 208 may consider several paths, for example by considering each possible path or by using heuristic methods to determine viable paths through the network. The graph circuitry 208 may select the path score that is the minimum of each possible path score for each path through the network to the second network node. As a continued example, the graph circuitry 208 may consider paths "A, C, D, B", "A, C, B", "A, C, E, B", and the like as a set of paths from node A to node B. The path associated with the lowest path score may be retained and considered the path score may be kept as the cumulative difficulty score.

Returning now to FIG. 3, as shown by operation 308, the apparatus 200 includes means, such as memory 204, graph circuitry 208, or the like, for, in an instance in which the cumulative difficulty score falls below a threshold parameter, adding the second network node to a set of blast radius nodes. The graph circuitry 208 may maintain, using memory 204 or other storage, a set of blast radius nodes. The set of blast radius nodes may represent the blast radius of the first network node, and may include each network node that falls below a specified cumulative difficulty score to compromise under the assumption that the first network node is compromised. The threshold parameter may be pre-determined using a default value, or may be specified by a user at the beginning of execution during the configuration of the method. The threshold parameter may be defined by setting a cumulative difficulty score that represents the ability of a typical attacker, where lower thresholds will generate blast radius outputs that are worse-case scenarios, and higher thresholds will generate blast radius outputs that are more conservative estimates.

As shown by operation 310, the apparatus 200 includes means, such as graph circuitry 208, or the like, for determining a total vulnerability score for the first network node based on the set of blast radius nodes. The graph circuitry 208 may aggregate data regarding the set of blast radius nodes to determine a total vulnerability score associated with the first network node. In some embodiments, the network nodes in the set of blast radius nodes may have a sensitivity value, importance value, or other numerical indication of the value of the nodes. The total vulnerability score may be based on summing the numerical indication of value of each node in the blast radius, so that a blast radius encompassing valuable assets leads to a larger vulnerability score than a blast radius encompassing the same number of less valuable assets.

The numerical indication of value may be a prior estimate of value and thus the vulnerability scores may be selected and/or adjusted based on organizational goals related to the computing network. For example, an attacker gaining control to personal data of users may be far more costly to an organization than an attacker gaining control of more mundane data, and the numerical indication of value may be adjusted accordingly to reflect greater vulnerability to resources that lead to loss of user data.

As shown by operation 312, the apparatus 200 includes means, such as graph circuitry 208, security analysis circuitry 210, or the like, for iterating over network nodes to compute a set of conditional difficulty scores. As mentioned previously, the graph circuitry 208, security analysis circuitry 210, and other circuitry of the apparatus 200 may iterate over each network node to compute the set of conditional difficulty scores, computing each conditional difficulty score according to the details described in connection with operation 304. For example, a first node may be selected, node "A", and a second node may be selected, node "B." The conditional difficulty score may be computed for an attacker to compromise node "B" given a compromised node "A." The iteration may be performed to find the difficulty for an attacker to compromise node "C" and subsequently every other network node given a compromised node "A."

In some embodiments, filters or selections may be placed, and/or heuristics may be used to avoid iterating over the entire set of network nodes. For example, completely disconnected network nodes with no relationship may default to an unconditional difficulty score to avoid computing a conditional difficulty score for each pair of network nodes. In some embodiments, configuration settings may disable the computation of conditional difficulty scores for various classes of network nodes.

As shown by operation 314, the apparatus 200 includes means, such as graph circuitry 208, security analysis circuitry 210, or the like, for iterating over network nodes to compute a set of cumulative difficulty scores. The graph circuitry 208, security analysis circuitry 210, and other circuitry of the apparatus 200 may iterate over each network node to compute the set of cumulative difficulty scores, computing each cumulative difficulty score according to the details described in connection with operation 306. For example, a first node may be selected, node "A", and a second node may be selected, node "B." The cumulative difficulty score may be computed for an attacker to compromise node "B" given a compromised node "A." The iteration may be performed to find the cumulative difficulty for an attacker to compromise node "C" and subsequently every other network node given a compromised node "A."

In some embodiments, filters or selections may be placed, and/or heuristics may be used to avoid iterating over the entire set of network nodes, as described above in connection with operation 312.

As shown by operation 316, the apparatus 200 includes means, such as graph circuitry 208, security analysis circuitry 210, or the like, for iterating over network nodes to compute a set of vulnerability scores. The graph circuitry 208, security analysis circuitry 210, and other circuitry of the apparatus 200 may iterate over each network node to compute the set of vulnerability scores, computing each vulnerability score according to the details described in connection with operation 310. For example, a first node may be selected, node "A", and a second node may be selected, node "B." The vulnerability score may be computed for an attacker to compromise node "B" given a compromised node "A." The set of cumulative difficulty scores to compromise every other network node (e.g., "B", "C", "D", etc.) may be computed to determine the set of cumulative difficulty scores. Subsequently, the first node may be designated, for example, as node "B" and the second node may be selected, node "C". The process may be iterated to ultimately determine a set of cumulative difficulty scores for every network node based on a compromised node "B". The iteration may continue to determine a set of cumulative difficulty scores and a vulnerability score based on each network node of the network graph.

In some embodiments, filters or selections may be placed, and/or heuristics may be used to avoid iterating over the entire set of network nodes, as described above in connection with operation 312. For example, approximations may be made to determine the conditional difficulty score to compromise node "B" given compromised node "A" by utilizing the conditional difficulty score to compromise node "A" given compromised node "B", or vice versa.

Figure 5:
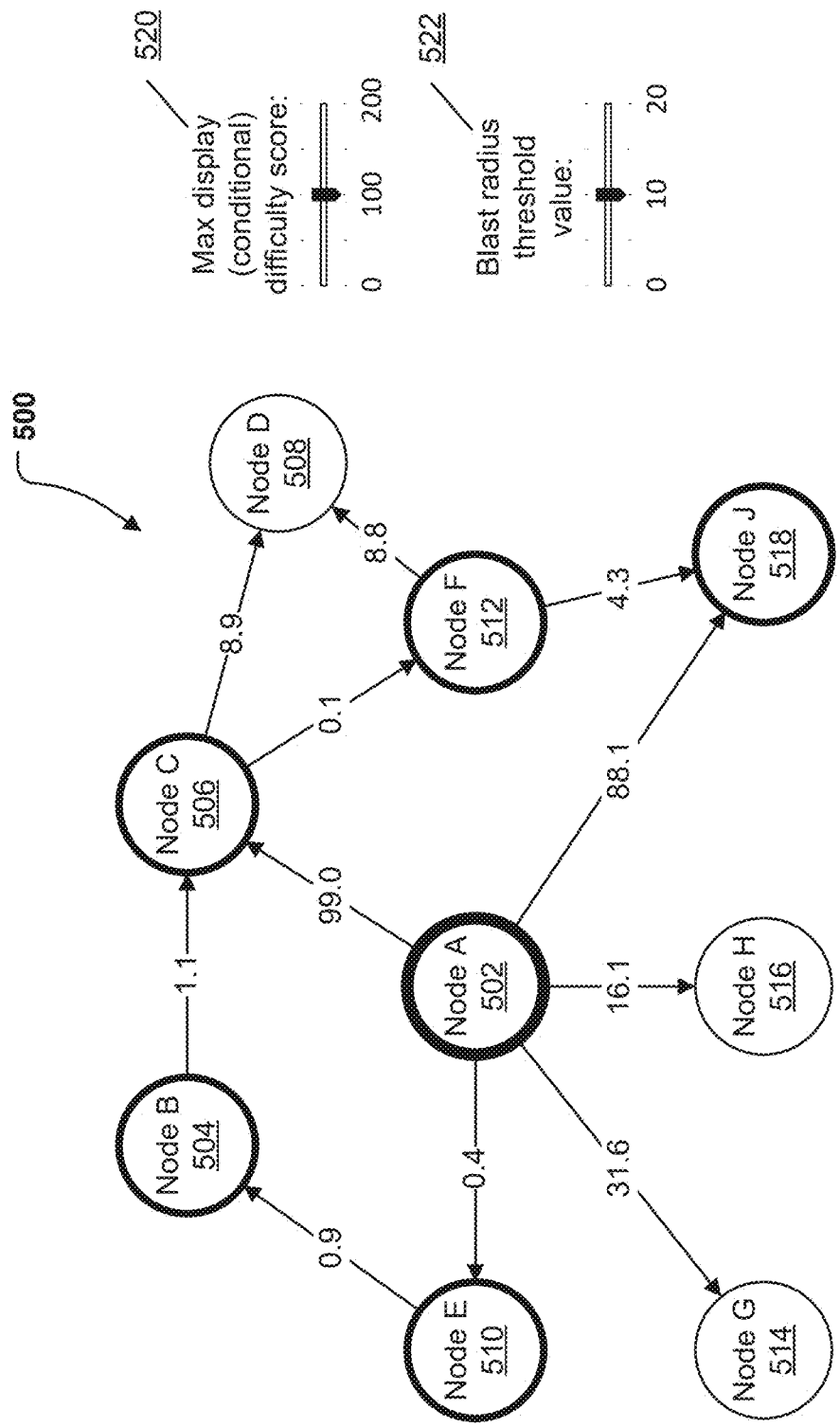
FIG. 5 illustrates another example user-facing visual presentation of the blast radius determination used in some example embodiments described herein.

Finally, as shown by operation 318, the apparatus 200 includes means, such as processor 202, communications hardware 206, or the like, for providing a ranking of vulnerable network assets based on a total vulnerability score from the set of total vulnerability scores associated with each network node. The processor 202 may rank the set of vulnerability scores, and the communications hardware 206 may provide the ranked list as output to indicate the most vulnerable and least vulnerable network nodes. The communications hardware 206 may present the ranked list as an interactive user interface, a web page, a document, or any other method of presenting the list known in the art. The ranked list of vulnerability scores may correspond to a ranked list of network nodes, where each network node in turn represents one or more network assets. The processor 202 may determine the set of vulnerable network assets and rank each network asset from most vulnerable (associated with the highest vulnerability score) to least vulnerable (associated with the lowest vulnerability score). The ranking of vulnerable network assets may be presented using a graphical user interface as a list or graphical representation (e.g., showing graph relationships between assets, as shown in FIG. 5). The ranking of vulnerable network assets may further include an indication of the vulnerability scores, network nodes, network assets, and connections among them.

FIGS. 3 and 4 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Turning to FIG. 5, a graphical user interface (GUI) is provided that illustrates a network graph 500 with network nodes and conditional difficulty scores. As noted previously, a user may interact with the blast radius determination system 102 by directly engaging with communications hardware 206 of an apparatus 200 comprising the blast radius determination system 102. In such an embodiment, the GUI shown in FIG. 5 may be displayed to a user by the apparatus 200. The GUI shown is an example method of displaying the information to the user, and the user may interact with the GUI by, for example, selecting different nodes, rearranging nodes, modifying elements of the network graph and re-computing conditional difficulty scores, for example.

The network graph 500 shown includes several nodes, including node A 502, node B 504, node C 506, node D 508, node E 510, node F 512, node G 514, node H 516, and node J 518. Arrows between nodes indicate conditional difficulty scores computed for compromising the pointed-to node assuming that the other node is compromised. For example, the difficulty to compromise node B 504 under the assumption that node E 510 is compromised is assigned a value of 0.9. Note that in a full evaluation of blast radius and network vulnerability, the conditional difficulty scores between each pair of network nodes may be determined, but only a subset of these conditional difficulty scores may be displayed in the GUI pictured in FIG. 5, and/or not all conditional difficulty scores and network node connections may be shown for clarify. For example, the conditional difficulty score to compromise network node E given a compromised network node B may be computed, but is not illustrated in FIG. 5. For example, the user may set a visualization selection to only show conditional difficulty scores below a value of "100", as shown by maximum conditional difficulty score slider 520.

The blast radius may be indicated by highlighting nodes associated with a cumulative difficulty score below a threshold value. The threshold value may be visually indicated and modified by GUI elements such as the blast radius threshold slider 522. In the example shown, node B 504, node C 506, node E 510, node F 512, and node J 518 have cumulative difficulty scores below a value "10" and are highlighted to indicate that they are within the blast radius. For example, node C 506 has a conditional difficulty score of 99.0 to reach from node A 502, but following the path from node E 510 to node B 504 to node C 506, the conditional difficulty scores along the path add up to 0.5+0.9+1.1=2.5.

CONCLUSION

As described above, example embodiments provide methods and apparatuses that enable improved assessment of network security vulnerabilities. By taking into account the complex relationships and cumulative effects of connected nodes, example embodiments provide a more complete picture of network vulnerability. Moreover, embodiments described herein provide quantitative results by producing numerical scores while still taking into account expert input, avoiding the limitations of a purely qualitative expert determination of vulnerability that may not account for complex graph relationships.

As these examples all illustrate, example embodiments contemplated herein provide technical solutions that solve real-world problems faced in the field of network security. While network security and risk analysis have been active fields for decades, quantitative solutions that use the full power of knowledge graphs have been previously unavailable. The recently arising ubiquity of knowledge graphs and recent advances in techniques for their analysis have unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for estimating vulnerability related to network blast radius of a network asset, the method comprising:
    receiving, by communications hardware, a network graph comprising a set of network nodes;
    selecting, by graph circuitry, a first network node from the set of network nodes;
    generating a set of conditional difficulty scores;
    computing, by the graph circuitry, a cumulative difficulty score for an attacker to compromise a second network node based on the set of conditional difficulty scores;
    computing, by security analysis circuitry, a difficulty score based on the cumulative difficulty score and on a difficulty for the attacker to compromise the second network node in an instance in which the attacker compromises the first network node;
    in an instance in which the difficulty score falls below a threshold parameter, adding, by the graph circuitry, the second network node to a set of blast radius nodes; and
    determining, by the graph circuitry, a total vulnerability score for the first network node based on the set of blast radius nodes.

2. The method of claim 1, wherein computing the cumulative difficulty score comprises:
    determining, by the graph circuitry, a path from the first network node to the second network node, wherein the path is associated with a set of path difficulty scores associated with pairs of nodes along the path;
    summing, by the graph circuitry, each path difficulty score from the set of path difficulty scores to obtain a summed difficulty score; and
    selecting, by the graph circuitry, a minimum score path for which the summed difficulty score is minimized, wherein the minimum score path is selected to be the cumulative difficulty score.

3. The method of claim 1, wherein generating the set of conditional difficulty scores includes:
    computing, by the security analysis circuitry, a first conditional difficulty score based on a difficulty for the attacker to compromise a third network node in an instance in which the attacker compromises the first network node and no additional network nodes;
    computing, by the security analysis circuitry, a second conditional difficulty score based on a difficulty for the attacker to compromise a fourth network node in the instance in which the attacker compromises the first network node and no additional network nodes; and
    adding, by the graph circuitry, the first conditional difficulty score and the second conditional difficulty score to the set of conditional difficulty scores.

4. The method of claim 1, further comprising computing the set of blast radius nodes by:
    selecting, by the graph circuitry, a next network node, wherein the next network node has not previously been selected;
    computing, by the security analysis circuitry, a next difficulty score for the attacker to compromise the next network node in an instance in which the attacker compromises the first network node; and
    in an instance in which the next difficulty score falls below the threshold parameter, adding, by the graph circuitry, the next network node to the set of blast radius nodes.

5. The method of claim 1, further comprising:
    selecting, by the graph circuitry, a next network node, wherein the next network node has not previously been selected;
    determining, by the security analysis circuitry, a next total vulnerability score for the next network node; and
    adding, by the graph circuitry, the next total vulnerability score to the set a set of total vulnerability scores.

6. The method of claim 5, further comprising:
    providing, by the communications hardware, a ranking of vulnerable network assets based on the set of total vulnerability scores.

7. The method of claim 1, wherein the network graph is a knowledge graph.

8. The method of claim 7, wherein computing the difficulty score is based on one or more subject-predicate-object relationships between the first network node and the second network node.

9. The method of claim 1, wherein determining the total vulnerability score is based on a prior estimate of value associated with the second network node.

10. An apparatus for estimating vulnerability related to network blast radius of a network asset, the apparatus comprising:
    communications hardware configured to receive a network graph comprising a set of network nodes;
    graph circuitry configured to select a first network node from the set of network nodes; and security analysis circuitry configured to:
  generate a set of conditional difficulty scores,
  compute a cumulative difficulty score for an attacker to compromise a second network node based on the set of conditional difficulty scores, and
  compute a difficulty score based on the cumulative difficulty score and on a difficulty for an attacker to compromise the second network node in an instance in which the attacker compromises the first network node,
wherein the graph circuitry is further configured to:
  in an instance in which the difficulty score falls below a threshold parameter, add the second network node to a set of blast radius nodes, and
  determine a total vulnerability score for the first network node based on the set of blast radius nodes.

11. The apparatus of claim 10, wherein the graph circuitry is configured to compute the cumulative difficulty score by:
  determining a path from the first network node to the second network node, wherein the path is associated with a set of path difficulty scores associated with pairs of nodes along the path;
  summing each path difficulty score from the set of path difficulty scores to obtain a summed difficulty score; and
  selecting a minimum score path for which the summed difficulty score is minimized, wherein the minimum score path is selected to be the cumulative difficulty score.

12. The apparatus of claim 10, wherein the security analysis circuitry is further configured to generate the set of conditional difficulty scores by:
  computing a first conditional difficulty score based on a difficulty for the attacker to compromise a third network node in an instance in which the attacker compromises the first network node and no additional network nodes;
  computing a second conditional difficulty score based on a difficulty for the attacker to compromise a fourth network node in the instance in which the attacker compromises the first network node and no additional network nodes; and
  adding the first conditional difficulty score and the second conditional difficulty score to the set of conditional difficulty scores.

13. The apparatus of claim 10, wherein the graph circuitry is further configured to compute the set of blast radius nodes by:
  selecting a next network node, wherein the next network node has not previously been selected;
  computing a next difficulty score for the attacker to compromise the next network node in an instance in which the attacker compromises the first network node; and
  in an instance in which the next difficulty score falls below the threshold parameter, adding the next network node to the set of blast radius nodes.

14. The apparatus of claim 10, wherein the graph circuitry is further configured to:
  select a next network node, wherein the next network node has not previously been selected;
  determine a next total vulnerability score for the next network node; and
  add the next total vulnerability score to a set of total vulnerability scores.

15. The apparatus of claim 14, wherein the communications hardware is further configured to provide a ranking of vulnerable network assets based on the set of total vulnerability scores.

16. The apparatus of claim 14, wherein computing the difficulty score is based on one or more subject-predicate-object relationships between the first network node and the second network node.

17. The apparatus of claim 10, wherein the network graph is a knowledge graph.

18. A computer program product for estimating vulnerability related to network blast radius of a network asset, the computer program product comprising at least one non-transitory computer-readable storage medium storing software instructions that, when executed, cause an apparatus to:
  receive a network graph comprising a set of network nodes;
  select a first network node from the set of network nodes;
  generate a set of conditional difficulty scores;
  compute a cumulative difficulty score for an attacker to compromise a second network node based on the set of conditional difficulty scores;
  compute a difficulty score based on the cumulative difficulty score and on a difficulty for an attacker to compromise the second network node in an instance in which the attacker compromises the first network node;
  in an instance in which the difficulty score falls below a threshold parameter, add the second network node to a set of blast radius nodes; and
  determine a total vulnerability score for the first network node based on the set of blast radius nodes.

19. The computer program product of claim 18, wherein the software instructions, when executed, cause the apparatus to:
  determine a path from the first network node to the second network node, wherein the path is associated with a set of path difficulty scores associated with pairs of nodes along the path;
  sum each path difficulty score from the set of path difficulty scores to obtain a summed difficulty score; and
  select a minimum score path for which the summed difficulty score is minimized, wherein the minimum score path is selected to be the cumulative difficulty score.

20. The computer program product of claim 18, wherein generating the set of conditional difficulty scores includes:
  computing a first conditional difficulty score based on a difficulty for an attacker to compromise a third network node in an instance in which the attacker compromises the first network node and no additional network nodes;
  computing a second conditional difficulty score based on a difficulty for the attacker to compromise a fourth network node in the instance in which the attacker compromises the first network node and no additional network nodes; and
  adding the first conditional difficulty score and the second conditional difficulty score to the set of conditional difficulty scores.

* * * * *